(12) United States Patent
Amakawa et al.

(10) Patent No.: US 11,983,002 B2
(45) Date of Patent: May 14, 2024

(54) FAILURE PROBABILITY ASSESSMENT SYSTEM AND METHOD THEREFOR

(71) Applicant: Hitachi, Ltd., Tokyo (JP)

(72) Inventors: Hiroaki Amakawa, Tokyo (JP); Yosuke Ueki, Tokyo (JP); Takahide Shinge, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/622,572

(22) PCT Filed: Jun. 10, 2020

(86) PCT No.: PCT/JP2020/022890
§ 371 (c)(1),
(2) Date: Dec. 23, 2021

(87) PCT Pub. No.: WO2021/005943
PCT Pub. Date: Jan. 14, 2021

(65) Prior Publication Data
US 2022/0357734 A1    Nov. 10, 2022

(30) Foreign Application Priority Data

Jul. 5, 2019   (JP) .................................. 2019-125861

(51) Int. Cl.
G05B 23/02         (2006.01)
(52) U.S. Cl.
CPC ....... *G05B 23/0283* (2013.01); *G05B 23/024* (2013.01)
(58) Field of Classification Search
CPC .... G05B 23/0283; G05B 23/024; G06N 7/01; G06N 20/00
See application file for complete search history.

(56) References Cited

U.S. PATENT DOCUMENTS 8,571,911 B1    10/2013  Meyer et al.
9,714,885 B2 *  7/2017  Qin .................. G01M 17/10
(Continued)

FOREIGN PATENT DOCUMENTS

JP    2017-076360 A    4/2017
JP    2017-142622 A    8/2017
WO    WO-2017/163561 A1    9/2017

OTHER PUBLICATIONS

Kyle Siegrist, "7.4 Bayesian Estimation" Apr. 24, 2022, LibreTexts Statistics, pp. 7.4.1-7.4.9. (Year: 2022).*
(Continued)

*Primary Examiner* — Mischita L Henson
(74) *Attorney, Agent, or Firm* — Foley & Lardner LLP (57) ABSTRACT

The problem of the present invention is to establish how to more accurately estimate the failure probabilities of the components of a machine system that has a small number of failure records. A failure probability assessment system 100 is a system for assessing a failure probability of a component composing a machine system and includes: a failure probability density function parameter database 4 for storing a parameter that determines the failure probability density function of the component; a failure probability density function identification unit 12 for calculating the failure probability density function of the component; and a damage model generation/update unit 7 for generating survival analysis data that has a minimum variation defined by the failure probability density function using failure history data and the time series operation data, wherein the failure probability density function identification unit 12 estimates a failure probability density function parameter from a past failure probability density function parameter stored in the failure probability density function parameter database 4 and the latest survival analysis data using the Bayes estimation.

4 Claims, 7 Drawing Sheets

(56) References Cited

U.S. PATENT DOCUMENTS

| | | | |
|---|---|---|---|
| 2005/0262394 A1 | 11/2005 | Yasukawa et al. | |
| 2013/0135110 A1* | 5/2013 | Xie | G08B 29/181 340/636.11 |
| 2017/0109222 A1 | 4/2017 | Singh et al. | |
| 2017/0181711 A1* | 6/2017 | Cheng | A61B 5/0022 |
| 2018/0232339 A1 | 8/2018 | Tasaki | |
| 2018/0335772 A1* | 11/2018 | Gorinevsky | G06Q 10/20 |

OTHER PUBLICATIONS

Christian Graf, Performing a Bayesian Analysis by Hand, Aug. 14, 2020, Towards Data Science, pp. 1-12 (Year: 2020).*
Y. Fukui, "Nyumon Shinraisei Kogaku," Morikita Publishing Co., Ltd., 2006.
International Search Report with English translation and Written Opinion issued in corresponding application No. PCT/JP2020/022890 dated Aug. 25, 2020.
Extended European search report issued in corresponding EP Application No. 20836969.4, dated Jun. 19, 2023 (9 pages).

* cited by examiner

| FAILURE OCCURRENCE DATE | | COMPONENT NAME |
|---|---|---|
| 2016/1/3 | 9:32 | ○○ |
| 2016/5/15 | 4:21 | △△ |
| 2016/12/20 | 17:53 | ×× |
| 2017/3/20 | 1:03 | □□ |
| 2017/3/29 | 13:21 | ○○ |
| 2017/10/4 | 13:21 | ×× |
| ⋮ | ⋮ | ⋮ |
| 2018/1/3 | 22:39 | □□ |

| NUMBER OF DAYS | STATE |
|---|---|
| 5 | OPERATION |
| 7 | OPERATION |
| 30 | OPERATION |
| 32 | OPERATION |
| 70 | FAILURE |
| 90 | FAILURE |
| 152 | FAILURE |
| 175 | OPERATION |
| 223 | OPERATION |
| 352 | FAILURE |
| 723 | FAILURE |
| 752 | FAILURE |
| ⋮ | ⋮ |
| 3521 | FAILURE |
| ⋮ | ⋮ |
| 7219 | OPERATION |

FAILURE PROBABILITY ASSESSMENT SYSTEM AND METHOD THEREFOR

TECHNICAL FIELD

The present invention relates to technologies regarding to diagnoses including the calculation of the failure probabilities of target objects. These target objects include machine systems (groups) including facilities, and in particular, include components composing the machine systems (groups).

BACKGROUND ART

In a machine system included in plants such as various kinds of factories or electric power generation facilities, it is extremely important that the failure risks of respective parts are appropriately grasped and managed and that maintenance including the repairs and replacements of the respective parts are performed at appropriate timings in order to make the system perform its predefined function normally. It should be noted that, in the case where plural same type of or similar type of machines are managed and operated, statistically analyzing failure records that occurred in past times makes it possible to estimate the number of failures that will occur in the future. Here, each of the failure records represents data that is recorded in the form of a pair of the content of a failure event and the date and time when the failure event occurred. A technology about how to calculate a failure rate showing the number of failures per unit time and the relevant failure probability obtained by integrating the failure rate through a statistical analysis using failure records is disclosed in NPTL 1 and the like.

CITATION LIST

Nonpatent Literature

NPTL 1: FUKUI Yasuyoshi. "Nyumon Shinraisei Kogaku," Morikita Publishing Co., Ltd., 2006

SUMMARY OF INVENTION

Technical Problem

However, since statistical information in past times is used in NPTL 1, a problem that a diagnosis and the calculation of a failure probability in line with the present situation cannot be performed remains unsolved.

To put it more concretely, the problem will be described as follows. The operation states of most of facilities and machine systems are not stable. For example, the operation state of a wind electric power generator changes from moment to moment depending on the state of wind, and the load on the wind electric power generator varies depending on the condition of its location. Therefore, the estimation accuracies of the number of failures and life expectancy obtained by simply assessing a failure rate per unit time and a failure probability have limitations.

Solution to Problem

In the present invention, in order to solve the abovementioned problem, the assessment of a failure probability is performed by calculating a "posterior probability distribution" in consideration of the latest operation state using a predefined "prior probability distribution" (Bayes estimation). Here, the latest "posterior probability distribution" (for example, obtained the day before) can be used as a "prior probability distribution."

An aspect of the present invention includes the following configuration. To put it concretely, an aspect of the present invention is configured in such a way that a failure probability density function parameter database for storing failure probability density function parameters for determining the failure probability density function of a target object, that is to say, the past failure probability density function parameters is implemented, survival analysis data showing a variation of the failure probability density function of the target object that satisfies a predefined condition is specified, and a posterior probability distribution with a probability distribution determined by the past failure probability density function parameter as its own prior probability distribution is estimated from the survival analysis data and the past failure probability density function parameters using the Bayesian estimation.

Advantageous Effects of Invention

According to the present invention, a failure probability assessment system capable of highly accurately estimating the failure probabilities of the components of a machine system that has a small number of failure records can be provided.

DESCRIPTION OF EMBODIMENT

Hereinafter, one example according to the present invention will be explained with reference to the accompanying drawings. Here, it is known well that the estimation accuracy of a method such as a maximum likelihood estimation method, which is known as a typical statistical analysis method, greatly depends on the number of data pieces of failure records. Since most of machine systems are fundamentally designed, operated, and managed so as not to get out of order, it is difficult in many cases to secure the number of data pieces of failure records large enough to grasp an accurate failure probability. Therefore, an object of the present example is to provide a failure probability assessment system capable of highly accurately estimating the failure probabilities of components of a machine system that has a small number of failure records.

The example according to the present invention will be explained taking a failure probability assessment system as an example, in which the targets of the failure probability assessment system are the components of plural machine systems composing a plant including various kinds of factories or electric power generation facilities that correspond to one example of machine system groups. Here, this failure probability assessment system is materialized by a so-called computer (information processing device), and the functions of the failure probability assessment system are performed in a computing unit analogous to a CPU that operates according to programs.

Figure 1:
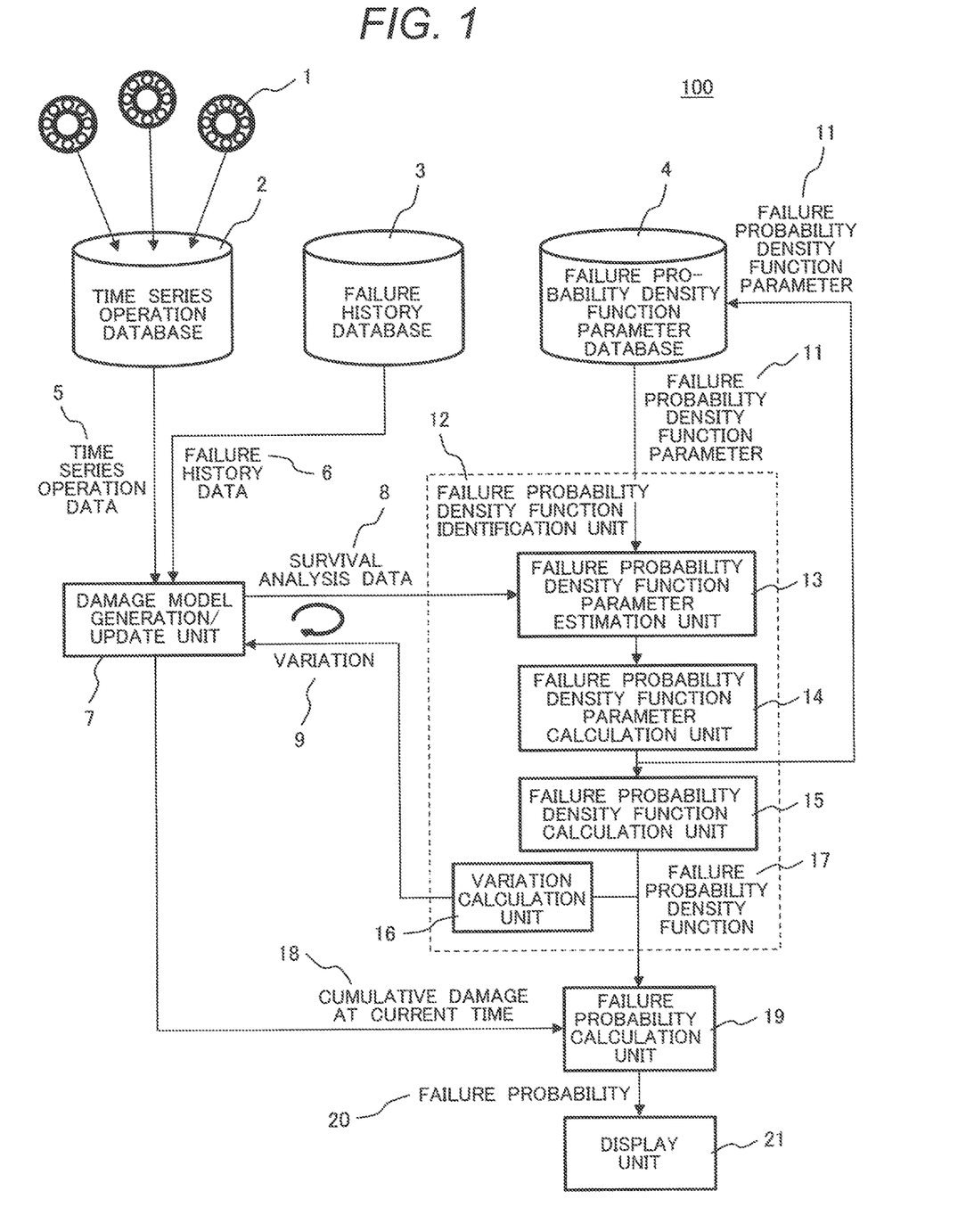
FIG. 1 is a system configuration diagram in the case where one example according to the present invention is applied to the components of a machine system.

FIG. 1 is the configuration diagram of a failure probability assessment system 100 in the case where the present example is applied to the diagnosis of the components of a machine system. Although FIG. 1 shows plural roller bearings as components 1, target objects to which the present invention is applied are not limited to the roller bearings.

The failure history data 6 of the components 1(pl.) is stored in a failure history database 3 shown in FIG. 1. Here, the failure history data 6 is data that is recorded in the form of a pair of a failure substance and the date and time when the failure event occurred. In this case, a failure history includes events involved in failures such as a "failure," an "abnormality," and a "part replacement." If each of the components 1, which is a target object, is equipped with a system for automatically detecting its own failure history, it is conceivable that a scheme for automatically storing data is implemented by connecting the system to the failure history database 3 via a network. Alternatively, it is conceivable that a person in charge of maintenance judges a failure event and registers the contents of the failure event. With the abovementioned configuration, it becomes possible that failure events that occurred in past times in the plural components 1 are stored in the failure history database 3.

Next, a time series operation database 2 will be explained. In the present example, operation data regarding the components 1 is stored in the time series operation database 2 via communication means such as a network. In this case, although a collection time period for each data is not necessarily defined as a specific value, since the estimation of failure probabilities is performed over a comparatively long period such as several months or several years in the present example, it is ideal that the collection time period should be set to be a day or so. In addition, although it is all right if the respective data is measured values sampled at arbitrary intervals, it is more preferable that statistical values such as maximum values, minimum values, average values, and standard deviations during a collection time period are used as the respective data. With this, it becomes possible that, although the amount of data is largely reduced, information about the failures of the components 1 is maximally utilized. Furthermore, information stored in the time series operation database 2 is not necessarily limited to information obtained from the components 1 themselves. For example, meteorological data such as temperatures and the like measured by meteorological observation facilities installed in the vicinity of the components 1 is useful in the assessment of the loaded conditions of the components 1.

Next, the generation of survival analysis data 8 and the identification of a failure probability density function 17, both of which are necessary for estimating a failure probability 20, will be explained. Here, in order to simplify the explanation, the identification method of the failure probability density function 17 using only the failure history data 6 without using time series operation data 5 will be explained. In other words, a condition in which the time series operation data 5 is not inputted into a damage model generation/update unit 7 will be assumed. Subsequently, the time series operation data 5 is inputted into the damage model generation/update unit 7, and the identification method of the failure probability density function 17 using a damage model generated taking the time series operation data 5 into consideration will be explained. In this case, although the above explanation has been made using only the failure history data 6 for convenience of explanation, the present invention also includes identification methods of the failure probability density function 17 using other data including the time series operation data 5.

(Generation of Survival Analysis Data 8 and Identification Method of Failure Probability Density Function 17 Using Only Failure History Data)

Figure 2:
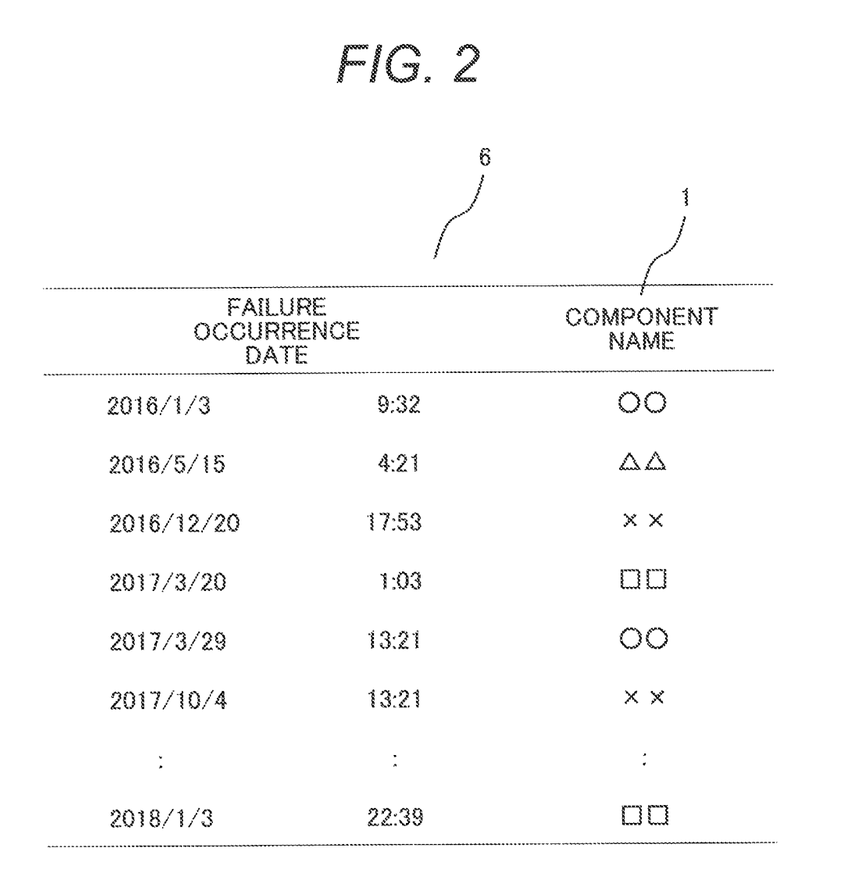
FIG. 2 shows the failure history data of the one example according to the present invention.

First, the failure history data 6 stored in the failure history database 3 is transformed into the survival analysis data 8 in such a way that the failure history data 6 can be used for an analysis performed in the damage model generation/update unit 7. Here, in the above transformation, the calculation method of the survival analysis data 8 may be any method as long as the survival analysis data 8 can be obtained as a result, and the contents of the calculation method is not limited to contents explained below. In addition, the survival analysis data 8 is obtained not only by the calculation performed in the failure probability assessment system 100, but also by receiving data from another system as long as the contents of the data can be specified.

Figure 3:
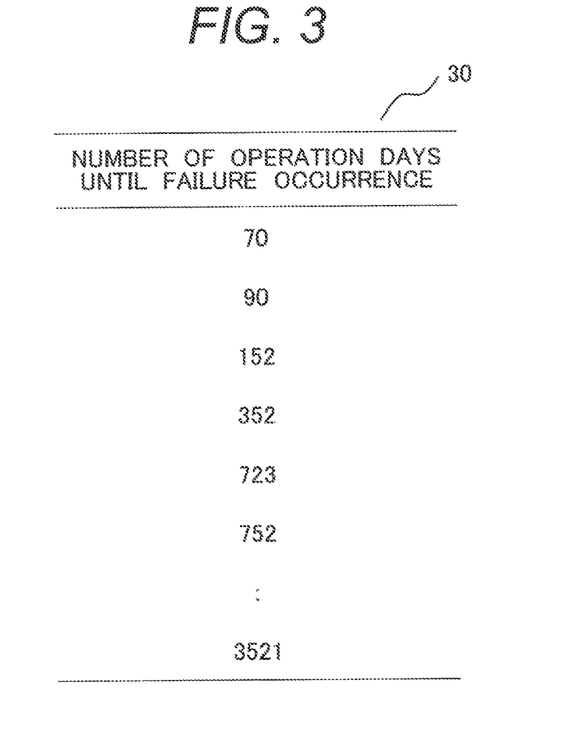
FIG. 3 shows the aggregated failure data of the one example according to the present invention.
Figure 4:
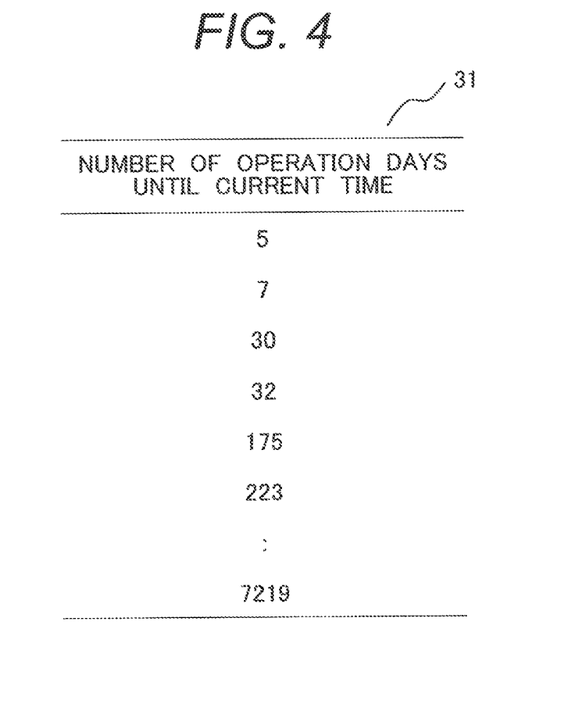
FIG. 4 shows the aggregated survival data of the one example according to the present invention.

What is necessary for the identification of the failure probability density function 17 is a time period from the occurrence of the previous failure event or the start of the operation of the system to the occurrence of this failure event. Since the time of the occurrence of the previous failure event is recorded in the failure history data 6, a time period between the previous failure event and this failure event can be calculated from a difference between the time of the occurrence of the previous failure event and the time of the occurrence of this failure event. Furthermore, if this failure event is the first failure event, a time period is calculated from a difference between the time of the operation start of the system and the time of the occurrence of this failure event. This processing is performed in the damage model generation/update unit 7, and the obtained data is transformed into data in a format similar to the format of aggregated failure data 30 shown in FIG. 3. In addition, in order to identify a likelier failure probability density function 17, it is necessary to take into consideration not only a failure event but also the fact that some components remain in a sound condition after operating continuously for a certain time period. It is usual that, even if a failure event occurs once in a system, the system is restored in a sound state in the shortest possible time and restarted by replacing or repairing a faulty component. Therefore, in the case where a failure probability density function 17 is identified at a certain time, it can be said at the certain time that most of the components 1 of the system have been operating from the previous failure events or the operation start of the system to the current time respectively. In order to reflect this fact, in the damage model generation/update unit 7, aggregated failure data 30 is generated, and further time periods from the current time to the times of the occurrences of failure events or to the start time of the system are aggregated and the aggregated time periods are transformed into aggregated survival data 31 as shown in FIG. 4. Eventually, in the damage model generation/update unit 7, the aggregated failure data 30 is given failure flags and the aggregated survival data 31 is given survival flags respectively, and these data pieces are integrated to generate survival analysis data 8 shown in FIG. 5.

Figure 5:
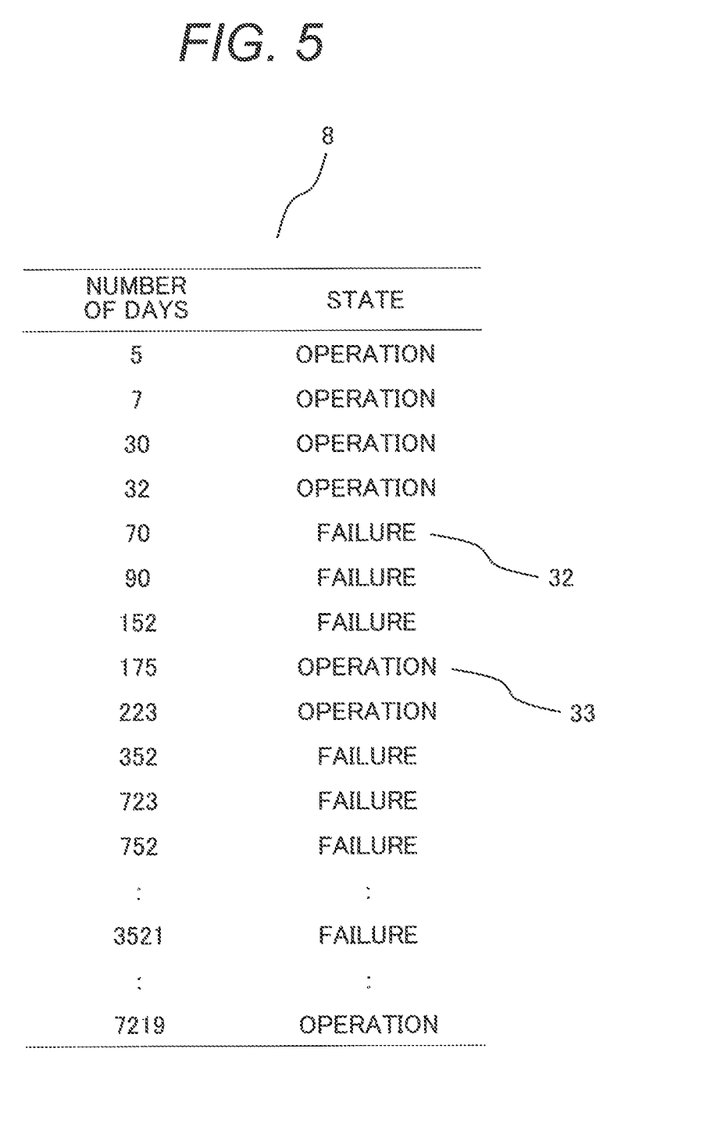
FIG. 5 shows the survival analysis data of the one example according to the present invention.

A failure probability density function identification unit 12 applies a certain failure probability density function 17 to this survival analysis data 8, and identifies a failure probability 20 by integrating this failure probability density function 17. Here, for simplifying the following explanation, it will be assumed that a damage that makes a target object faulty is represented simply by a cumulative operation time period since the time series operation data 5 is not taken into consideration. A method for identifying a failure probability density function 17 from data including both failure data and survival data such as survival analysis data 8 in operation time periods is called a survival analysis, and some concrete methods are known as survival analyses.

As a failure probability density function 17, some aftermentioned functions can be used. First, a case of using a Weibull distribution, which is a typical function as a failure probability density function 17, will be described. The Weibull distribution f(t), which is a failure probability density function 17 at a certain time t, is defined by Expression 1.

[Expression 1]

$$f(t) = \frac{k}{l}\left(\frac{t}{l}\right)^{k-1} \exp\left\{-\left(\frac{t}{l}\right)^k\right\} \quad \text{(Expression 1)}$$

In Expression 1, k and l is parameters determining the Weibull distribution, and called a shape parameter and a scale parameter respectively. Furthermore, by integrating Expression 1 with respect to a cumulative operation time period T, a failure probability 20, which shows a probability that a failure occurs during the cumulative operation time period T, can be given from Expression 2.

[Expression 2]

$$F(T) = \int_0^T f(t)dt = 1 - \exp\left\{-\left(\frac{T}{l}\right)^k\right\} \quad \text{(Expression 2)}$$

It will be assumed in the present example that the parameter of a failure probability density function 17, which determine a failure probability 20 in this way, is called a failure probability density function parameter 11. If the failure probability density function 17 is the Weibull distribution, the failure probability density function parameters 11 are the shape parameter k and the scale parameter l. In the present example, by utilizing the property of a failure probability density function 17 that the failure probability density function 17 is determined by the relevant failure probability density function parameters 11, the failure probability density function identification unit 12 identifies the failure probability density function 17 using past failure probability density function parameters 11 and the latest survival analysis data 8. Subsequently, a variation 9 is calculated by a variation calculation unit 16, and the calculated variation 9 is fed back to the after-mentioned damage model generation/update unit 7. The failure probability density function 17 is identified along the abovementioned flow, and the failure probability 20 of the present component 1 is estimated from the present cumulative operation time period by a failure probability calculation unit 19.

Figure 6:
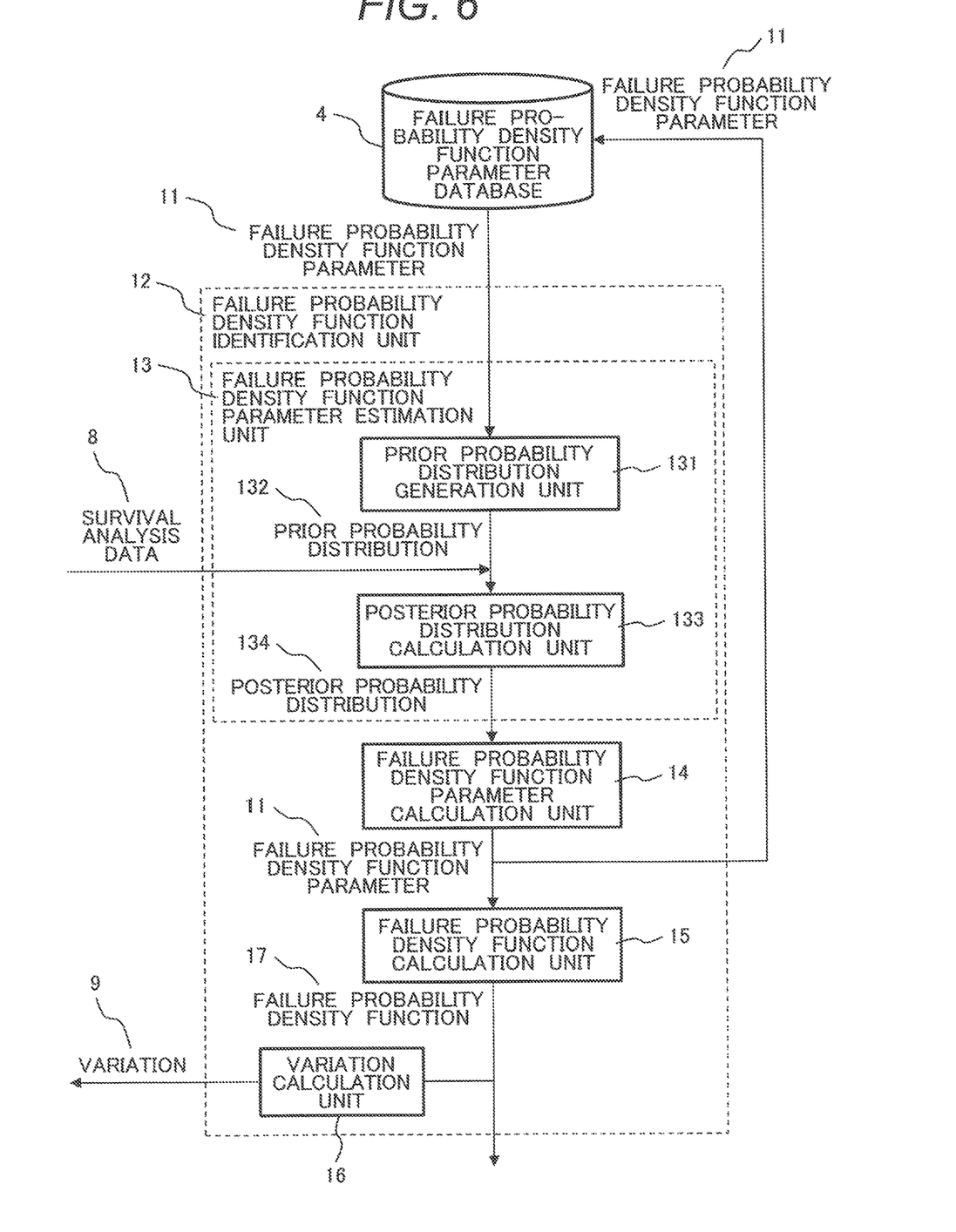
FIG. 6 is the system configuration diagram of a failure probability density function identification unit of the one example according to the present invention.

Hereinafter, an identification method of a failure probability density function 17 will be explained in detail with reference to FIG. 6 showing the system configuration of the failure probability density function identification unit 12 in detail. In a failure probability density function parameter estimation unit 13 of the failure probability density function identification unit 12, a failure probability density function 17 that is well compatible with the survival analysis data 8 is estimated using the Bayes estimation. Generally speaking, the Bayes estimation is an estimation in which a probability density distribution $\pi(\theta|D)$ that is a parameter to be wanted is estimated using a product of a likelihood function $L(D|\theta)$ and the prior probability distribution 132 $(=\pi(\theta))$ of the parameter on the basis of the fundamental formula of the Bayes statistics given by Expression 3.

[Expression 3]

$$\pi(\theta|D) \propto L(D|\theta)\pi(\theta) \quad \text{(Expression 3)}$$

Here, D represents data, and corresponds to the survival analysis data 8 in the present example. $\theta$ is generally called a population parameter, and a constant number that determines the failure probability density function 17 to which the data D is subjected. In the present example, a failure probability density function parameter 11 corresponds to the population parameter $\theta$. The failure probability density function parameter estimation unit 13 estimates the failure probability density function parameters 11 using the Bayes estimation. Therefore, the failure probability density function parameter estimation unit 13 is equipped with a prior probability distribution generation unit 131 that generates the prior probability distribution 132 $(\pi(\theta))$ of the failure probability density function parameters 11 and a posterior probability distribution calculation unit 133 that calculates a posterior probability distribution 134 from the prior probability distribution 132 and the likelihood function. $\theta(D|\theta)$ is a failure probability density distribution of the population parameter $\theta$ at the time the data D is obtained, and called a posterior probability distribution 134. The likelihood function $L(D|\theta)$ is a probability that the data D is obtained at the time the population parameter $\theta$ is given, and the prior probability distribution $\theta(e)$ is the probability distribution of an assumed population parameter $\theta$. In the Bayes estimation, by assuming the prior probability distribution 132 $(\pi(\theta))$ of an estimation target in order to identify a function that is best compatible with the data D, an estimation can be made even from a comparatively small number of data pieces.

First, the generation of a prior probability distribution 132 will be explained. Generally speaking, as a prior probability distribution 132, a probability density distribution of a uniform distribution, a normal distribution, or a gamma distribution is used. The prior probability distribution 132 of the present example is not limited to any of the abovementioned probability distributions, and any function may be selected on the basis of the experience of a user. However, a uniform distribution is a probability density distribution representing that all events occur with equal probability. In a case of a uniform distribution used as a prior probability function, the prior probability distribution is generally called a no-prior information distribution, and has the least prior information about an estimation target. Therefore, in a case of an estimation of the failure probability 20 of a component 1 with a small number of failure history data pieces 6 that the present invention tries to solve, there is a possibility that the estimation calculation of the failure probability density function parameter 11 does not converge or the accuracy of the estimation calculation is not high even if the estimation calculation converges. Judging from the above, it is preferable that a normal distribution or a gamma distribution should be selected as the prior probability distribution 132.

In the present example, a case of using a normal distribution will be described for example.

A normal distribution is represented by the next Expression 4.

[Expression 4]

$$\pi(\theta) = \frac{1}{\sqrt{2\pi\sigma^2}} \exp\left\{-\frac{(\theta-\mu)^2}{2\sigma^2}\right\} \quad \text{(Expression 4)}$$

In Expression 4, $\mu$ is an average value, $\sigma^2$ is a variance, and $\pi$ is the circular constant. If a failure probability density function 17 is the Weibull distribution, the prior probability distributions 132 of the failure probability density function parameters 11 $k$ and $l$ are represented by Expression 5 and Expression 6 respectively.

[Expression 5]

$$\pi(k|\mu_k, \sigma_k^2) = \frac{1}{\sqrt{2\pi\sigma_k^2}} \exp\left\{-\frac{(k-\mu_k)^2}{2\sigma_k^2}\right\} \quad \text{(Expression 5)}$$

[Expression 6]

$$\pi(l|\mu_l, \sigma_l^2) = \frac{1}{\sqrt{2\pi\sigma_l^2}} \exp\left\{-\frac{(l-\mu_l)^2}{2\sigma_l^2}\right\} \quad \text{(Expression 6)}$$

In the prior probability distribution generation unit 131, the prior probability distributions 132 ($=\pi(k|\mu_k, \sigma_k^2)$ and $\pi(l|\mu_l, \sigma_l^2)$) are generated from the failure probability density function parameters 11 $k$ and $l$ obtained from a failure probability density function parameters database 4. In the case of using the normal distribution, since an expectation value and an average value $\mu$ are equal to each other, it is desirable that k and l obtained from the failure probability density function database 4 should be used as $\mu_k$ and $\mu_l$ of the prior probability distributions 132. Furthermore, variances $\sigma_k^2$ and $\theta_l^2$ are also stored in the failure probability density function parameter database 4, and it is preferable that the variances $\sigma_k^2$ and $\sigma_l^2$ should be retrieved from the failure probability density function parameter database 4 when the prior probability distribution 132 is generated.

Next, the posterior probability distribution calculation unit 133 will be described. The likelihood function $L(D|\theta)$ is represented by the following expression if the Weibull distribution is used as the failure probability density function 17.

[Expression 7]

$$L(D|\theta) = L(D|l, k) = \frac{k}{l}\left(\frac{D}{l}\right)^{k-1} \exp\left\{-\left(\frac{D}{l}\right)^k\right\} \quad \text{(Expression 7)}$$

The posterior probability distribution 134 ($=\pi(\theta|D)$) is calculated by applying Expression 5, Expression 6, and Expression 7 to Expression 3 that is the fundamental formula of the Bayes statistic. Since it is difficult to analytically execute the calculation of Expression 3, the calculation of Expression 3 is generally executed by numerical calculation using a computer such as the Markov Chain Monte Carlo or the Hamiltonian Monte Carlo. The calculation method of the present invention is not limited to any of the above calculation methods, but an arbitrary calculation method may be selected on the basis of the experience of a user.

Subsequently, in the failure probability density function parameter calculation unit 14, the failure probability density function parameter 11 is calculated from the posterior probability distribution 134. Although means for calculating the failure probability density function parameter 11 from the posterior probability distribution 134 is not limited to specific means, it is preferable to set the expectation value of the posterior probability distribution 134 to the failure probability density function parameter 11. The obtained failure probability density function parameter 11 is stored in the failure probability density function parameters database 4.

Finally, a failure probability density function 17 represented as shown Expression 2 is calculated from failure probability density function parameters 11 in a failure probability density function calculation unit 15. Subsequently, the variation 9 of the failure probability density function 17 is calculated by the variation calculation unit 16, and the calculated variation 9 is fed back to the damage model generation/update unit 7. To put it concretely, as this variation 9, it is preferable to use a variation coefficient obtained by dividing the standard deviation of the failure probability density function 17 by the average value of the failure probability density function 17. This is because, if a variation is defined using a standard deviation or a variance, it is difficult to uniformly assess variations regarding different variables (the after-mentioned damage models).

On the other hand, the failure probability density function parameters 11 stored in the failure probability density function parameter database 4 are used for identifying the next failure probability density function 17 after an arbitrary time period goes by. The latest failure probability density function 17 is identified anew using the stored failure probability density function parameters 11 and the newly generated survival analysis data 8. In this case, although an identification interval for the failure probability density function 17 is not necessarily limited to a specific interval, since the estimation of failure probabilities is performed over a comparatively long time period such as several months or several years in the present example, it is ideal that the identification interval should be set to be a day or so. In addition, failure probability density function parameters 11 obtained by referring to the failure probability density function parameter database 4 are not necessarily limited to the past parameters of the component 1, but also may be failure probability density function parameters 11 of the same type of machine or a similar type of machine. In the case where it is soon after a component 1, which is an estimation target, starts to operate and the number of the failure history data pieces 6 is small and the estimation accuracy of the failure probability 20 cannot be expected to be high, highly accurate estimation can be made by using the failure probability density function parameters 11 of the same type of machine or a similar type of machine that have been in operation in advance. Furthermore, assuming that plural components 1 are in the same loaded conditions, even if same failure probability density function parameter 11 is used in common for the plural components 1, a highly accurate estimation can be expected.

(Identification Method of Failure Probability Density Function 17 in a Case of Taking Time Series Operation Data 5 into Consideration in Failure History Data 6)

Next, the update of a damage model in the damage model generation/update unit 7 will be explained. Here, "consideration" means to perform processing which the time series operation data 5 is reflected in or added to. In the damage model generation/update unit 7, a damage model for which a time series operation data 5 that makes the variation 9 of the failure probability density function 17 minimum is taken into consideration is automatically searched for, and the damage model is reflected in the survival analysis data 8. In other words, the update of the damage model is traced back to an optimization problem having an objective function as a variation 9 and a damage model as a variable. A cumulative damage model is a model that represents a cumulative damage that makes a target faulty as a function of time series operation data, and is represented by Expression 8. Here, although the objective function that makes the variation 9 minimum has been described in the present example, a function that satisfies the constrained condition of the variation 9 can be used instead of the objective function.

[Expression 8]

$$D(x) = \sum_{t=0}^{\Delta t} d(x_t) \qquad \text{(Expression 8)}$$

Here, d(x) is a damage model per unit time, and $x_t$ is an operation data vector representing the $t^{th}$ time series operation data set. The target of the present invention is a wear-out failure among an initial failure, an accidental failure, and a wear-out failure. Therefore, since a phenomenon that causes a failure due to damage accumulation is handled, the time integral of d(x) is defined as a cumulative damage model D(x). Here, the abovementioned case where the time series operation data 5 is not considered is equivalent to x=[1], and the cumulative damage D(x) at the time when an arbitrary operation time step Δt goes by is equal to Δt. In the present invention, the shape of the expression of the damage model is not particularly specified. For example, it is a simplest way to represent a damage in the form of a linear combination of the time series operation data as shown by Expression 9, and an optimization calculation can be done in a comparatively low calculation cost.

[Expression 9]

$$d(x) = C^T \cdot x \qquad \text{(Expression 9)}$$

Here, C is a coefficient vector representing weightings for respective time series operation data.

Whichever method may be selected, since the number of variables used in this case is equal to the number of the undetermined coefficients of a damage model themselves, a comparatively large-scaled optimization problem has to be addressed. In addition, since there is a case of an objective function being non-convex, it is preferable to use meta-heuristics such as a genetic algorithm or a particle swarm optimization. On the other hand, if the failure mechanism is utterly unknown, it is conceivable that a scheme that automatically searches for the shape of the expression itself using a genetic programming (GP) is adopted. However, if the GP is adopted, the relevant calculation load becomes large, so it is necessary to carefully examine whether a sufficient amount of calculation resources can be secured or not as to whether to adopt the GP or not. Whichever scheme may be adopted, the update of the damage model and the assessment of the variation 9 are repeatedly executed in the damage model generation/update unit 7 to finally execute a convergence judgment, so that it becomes possible to define a failure probability density function 17 that provides a smaller variation coefficient.

Next, the failure probability calculation unit 19 will be explained. The failure probability density function 17 obtained so far is a function that shows the number of failures per unit damage at the time when arbitrary cumulative damages are accumulated. Therefore, in the failure probability calculation unit 19, a failure probability 20, which shows a probability that a failure occurs until the current time, that is to say, until the time when the cumulative damage 18 at the current time is loaded, is calculated by integrating the failure probability density function 17. To put it concretely, if the failure probability density function 17 is the Weibull distribution, the failure probability 20 is represented by Expression 10 that is given by representing Expression 2 using the cumulative damage D at the current time.

[Expression 10]

$$F(D) = \int_0^D f(d)dd = 1 - \exp\left\{-\left(\frac{D}{l}\right)^k\right\} \qquad \text{(Expression 10)}$$

As described above, in the present example, even in a case of a component 1 with a small number of failure history data pieces 6, the failure probability density function 17 can be identified with a high degree of accuracy by using the Bayes estimation for the failure probability density function identification unit 12. Furthermore, a failure probability density function parameter database 4 for storing the failure probability density function parameters 11 of the failure probability density function 17 is installed. Here, by using the past failure probability density function parameters included in this and the failure probability density function parameters of the same type of machines and similar types of machines, it becomes possible to identify a failure probability density function 17 with a high degree of accuracy even if the number of the failure history data pieces 6 is smaller. And by identifying a failure probability density function 17 based on a damage model optimized so that the variation 9 becomes the smallest, a highly accurate failure probability density function 17 based not on the simple assessment of the failure probability per unit time but on the cumulative load amount in consideration of the time series operation data 5 can be provided.

The above-described damage model generation/update unit 7, the failure probability density function identification unit 12, and the failure probability calculation unit 19 are implemented as computer programs respectively, but the concrete implementation configurations of the respective programs in computers are not necessarily limited. However, the damage model generation/update unit 7 has to perform calculation processing with a comparatively high calculation cost while calling out the failure probability density function identification unit 12 repeatedly, so that it is ideal that both should be implemented on the same computer.

Figure 7:
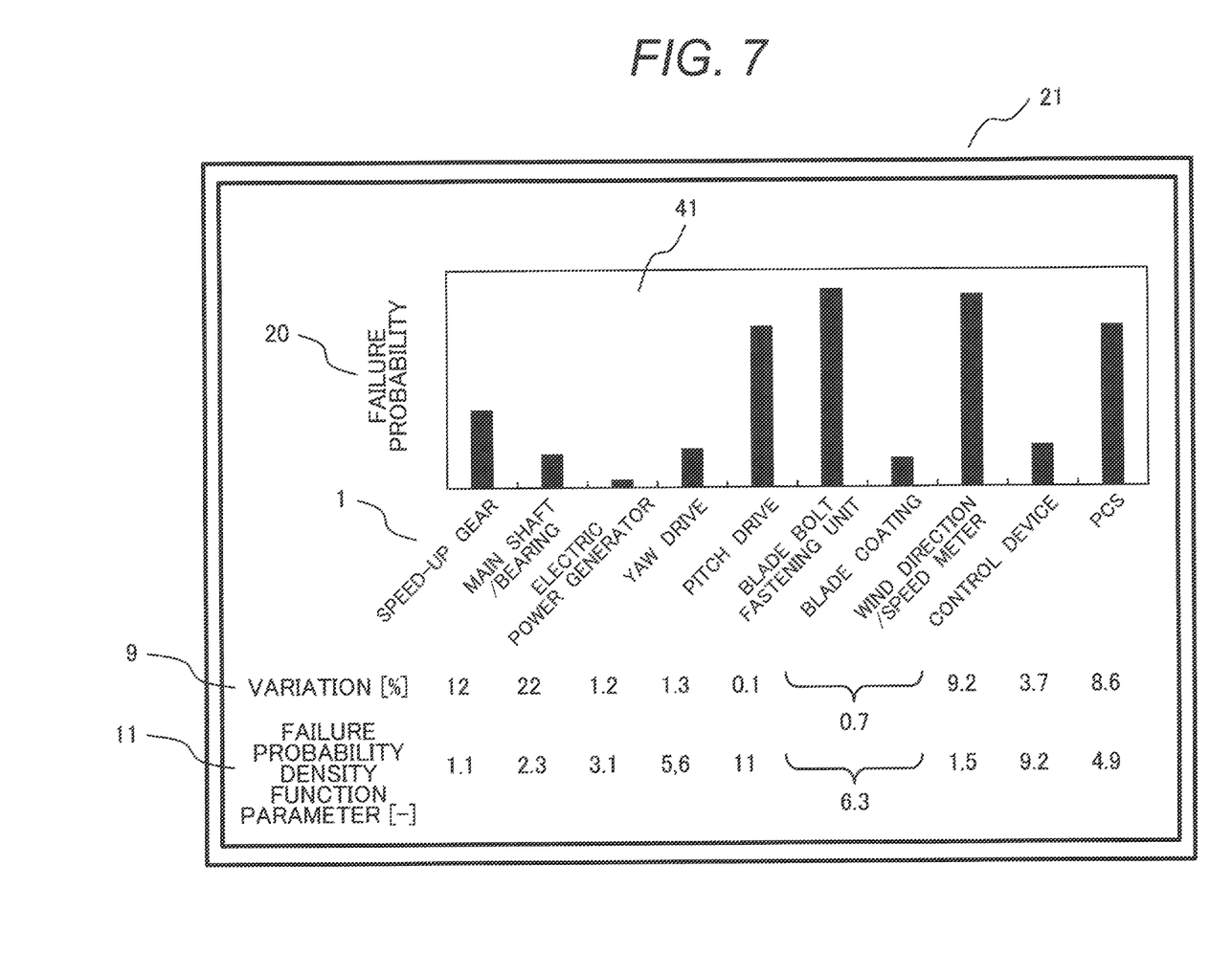
FIG. 7 shows an example of the display unit of the one example according to the present invention.

Lastly, display performed on a display unit 21 will be explained. Although the display unit 21 includes a computer in which a screen drawing program is implemented and a display device in concrete terms, the computer used here is not necessarily equal to a computer including the above-described components (7, 12, and 19). FIG. 7 shows an example of a graphical user interface (GUI) suitable for being used in the display unit 21. The GUI displays the current failure probabilities 20 of respective components of each machine as a failure probability graph 41. With this, a user can easily confirm which machine has a component with a higher failure risk among the components, to which the user pays attention, of the respective machines. In addition, variations 9 and failure probability density function parameters 11 are also displayed, the reliabilities of the displayed failure probabilities can be easily grasped. Although a platform on which a program implementing the GUI is installed is not limited at all by the present invention, the program is installed as a web application that operates on a web browser, and is mounted on the same computer that the abovementioned elements (7, 12, and 19) are mounted on. If the above computer can be connected from a computer terminal that the user uses (a user terminal) via communication means such as a network, a calculation capacity and prerequisite software required of the user terminal may be minimum. In the case where plural users access the present system in parallel, such a configuration is especially advantageous.

Furthermore, it is conceivable that the calculation technique used in the present example and the failure probability calculated using this calculation technique are applied to managements of machine systems and facilities such as factories and plants. In addition, these may be applied to so-called machine insurance. For example, it is conceivable that the rate of machine insurance is determined using the failure probability. Furthermore, the calculation of the rate may be executed periodically at the same time as the failure probability is calculated. In addition, it is also considered that these calculation technique and failure probability are also applied to insurance which includes fires, erosion, rust, and the like due to aging in the category of failures covered by the insurance.

Figure 8:
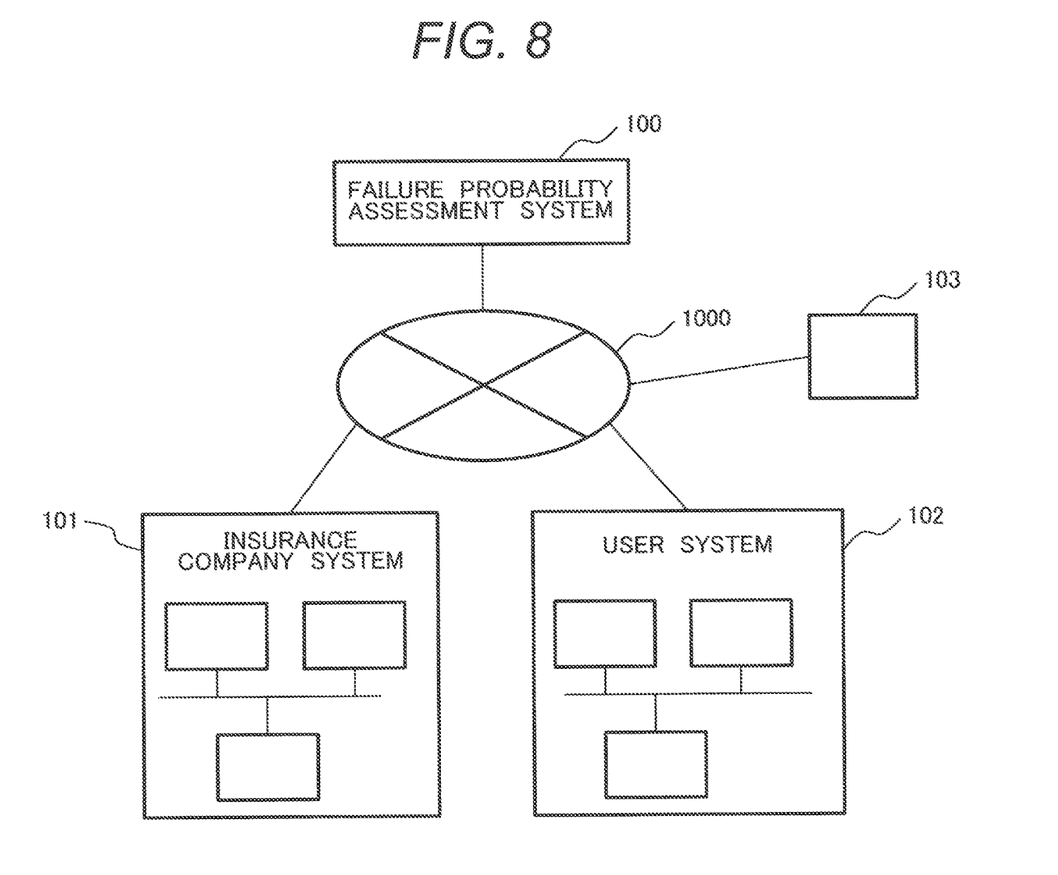
FIG. 8 is the configuration diagram of a cloud system to which the one example according to the present invention is applied.

In the case where these calculation technique and failure probability are applied to insurance as above, the relevant pieces of processing may be performed in a cloud system shown in FIG. 8. In this cloud system, the failure probability assessment system 100 from which the display unit 21 is removed is connected to an insurance company system 101 and a user system 102 via a network 1000. These insurance company system 101 and user system 102 are respectively equipped with networks such as intranets, and the respective information devices (terminals and servers) of each system are configured to be capable of accessing the failure probability assessment system 100. Furthermore, there may be a terminal 103 that is connected to the network 1000 without going through any intranet. Here, it will be assumed that each terminal is equipped with a display unit 21.

In this example, also in the user system 102, a failure probability assessment system 100 calculates failure probabilities in predefined intervals as instructed or automatically according to the abovementioned processing. Subsequently, the failure probability assessment system 100 transmits the calculation results to the insurance company system 101, and a server possessed by the insurance company system 101 calculates the rate of machine insurance to develop an insurance product. Alternatively, it is conceivable that the failure probability assessment system 100 calculates an insurance usage rate, and transmits the calculated insurance usage rate to the insurance company system 101. In addition, since the insurance company system 101 is connected to branch offices of the insurance company via networks, it is possible that the rates of insurances calculated by the insurance company system 101 and the contents of insurance products are confirmed in terminals (not shown) installed in the branch offices.

Furthermore, in the case where these calculation technique and failure probability are applied to facility management, the failure probability calculated by the failure probability assessment system 100 can be confirmed in a terminal of the user system 102. Or it is conceivable that a predictive diagnosis result (including a maintenance schedule) obtained on the basis of the failure probability is enabled to be displayed on a terminal of the user system 102. In this case, the predictive diagnosis result may be calculated by the failure probability assessment system 100 or the user system 102 may calculate the predictive diagnosis result using the failure probability calculated by the failure probability assessment system 100. In addition, it is also conceivable that a terminal used by a maintenance personnel (for example, the terminal 103) is informed of maintenance instructions based on the predictive diagnosis result by the user system 102.

REFERENCE SIGNS LIST

1 . . . Component
2 . . . Time Series Operation Database
3 . . . Failure History Database
4 . . . Failure Probability Density Function Parameter Database
5 . . . Time Series Operation Data
6 . . . Failure History Data
7 . . . Damage Model Generation/Update Unit
8 . . . Survival Analysis Data
9 . . . Variation
11 . . . Failure Probability Density Function Parameter
12 . . . Failure Probability Density Function Identification Unit
13 . . . Failure Probability Density Function Parameter Estimation Unit
14 . . . Failure Probability Density Function Parameter Calculation Unit
15 . . . Failure Probability Density Function Calculation Unit
16 . . . Variation Calculation Unit
17 . . . Failure Probability Density Function
18 . . . Cumulative Damage at Current Time
19 . . . Failure Probability Calculation Unit
20 . . . Failure Probability
21 . . . Display Unit
30 . . . Aggregated Failure Data
31 . . . Aggregated Survival Data
32 . . . Failure Flag
33 . . . Survival Flag
41 . . . Failure Probability Graph
100 . . . Failure Probability Assessment System
101 . . . Insurance Company System
102 . . . User System
103 . . . Terminal
131 . . . Prior Probability Distribution Generation Unit
132 . . . Prior Probability Distribution
133 . . . Posterior Probability Distribution Calculation Unit
134 . . . Posterior Probability Distribution

The invention claimed is:
1. A system for assessing a failure probability of a target object, the system comprising:
  a computer comprising one or more processors and memory, the computer configured to:
    store, in a failure probability density function parameter database, past failure probability density function parameters for determining a failure probability density function of the target object;
    store, in a failure history database, past failure history data for the target object;
    store, in a time series operation database, time series operation data showing operational states of the target object;
    generate survival analysis data using the past failure history data and the time series operation data;

identify the survival analysis data showing a variation of the failure probability density function of the target object that satisfies a predefined condition, wherein the variation of the failure probability density function of the target object is minimized;

estimate, using Bayesian estimation, a posterior probability distribution with a probability distribution determined based on the time series operation data, the survival analysis data and the past failure probability density function parameters;

calculate a present or future failure probability density function parameter from the posterior probability distribution; and display an estimated failure probability of the target object.

2. The system according to claim 1, wherein the computer is further configured to calculate the failure probability density function of the target object by performing statistical processing on the present or future failure probability density function parameter based on the past failure history data.

3. A method for assessing a failure probability of a target object using an information processing device comprising a computer, the method comprising:

storing, by the computer, in a failure probability density function parameter database, failure probability density function parameters for determining the failure probability density function of the target object;

storing, by the computer, in a failure history database, past failure history data for the target object;

storing, by the computer, in a time series operation database, time series operation data showing operational states of the target object;

generating, by the computer, survival analysis data based on the past failure history data and the time series operation data;

identifying, by the computer, the survival analysis data indicating a variation of the failure probability density function of the target object that satisfies a predefined condition, wherein the variation of the failure probability density function of the target object is minimized;

estimating, by the computer, using Bayesian estimation, a posterior probability distribution with a probability distribution determined based on the time series operation data, the failure probability density function parameters as a prior probability distribution of the survival analysis data and the failure probability density function parameters;

calculating, by the computer, a present or future failure probability density function parameter from the posterior probability distribution; and displaying, by the computer, an estimated failure probability of the target object.

4. The method according to claim 3, wherein calculating the failure probability density function of the target object comprises performing, by the computer, statistical processing on the present or future failure probability density function parameter based on the past failure history data.

\* \* \* \* \*